United States Patent [19]

Lee

[11] Patent Number: 4,957,130
[45] Date of Patent: Sep. 18, 1990

[54] CLEANING APPARATUS FOR CONTACT LENSES

[76] Inventor: Chien H. Lee, 3 Fl., No. 3, Alley 16, Lane 591, Sec. 1, Nei Hu Rd., Taipei, Taiwan

[21] Appl. No.: 391,239

[22] Filed: Aug. 9, 1989

[51] Int. Cl.$^5$ .............................................. B08B 3/04
[52] U.S. Cl. ................................... 134/158; 134/162; 134/200; 134/901; 74/63
[58] Field of Search ............... 134/140, 149, 158, 162, 134/901, 200; 74/63

[56] References Cited

U.S. PATENT DOCUMENTS

| | | | |
|---|---|---|---|
| 1,393,687 | 10/1921 | Hostater | 134/162 |
| 2,277,919 | 3/1942 | Liptak | 134/162 X |
| 3,227,166 | 1/1966 | Martz | 134/162 X |
| 3,623,492 | 11/1971 | Frantz | 134/149 X |
| 3,688,678 | 9/1972 | Dalen | 134/162 X |
| 4,776,360 | 10/1988 | Shin | 134/162 X |

Primary Examiner—Frankie L. Stinson
Attorney, Agent, or Firm—Morton J. Rosenberg; David I. Klein

[57] ABSTRACT

A cleaning apparatus for contact lenses including a housing, an enclosure in which a transmission means is installed, a knob and two containers. The transmission means has a main gear which is centrally disposed on a plate within an upper portion of the enclosure and loaded with a coil spring, a compound gear and a single gear. The main gear and the single gear are engageable with the compound gear. The main gear is activated by an upper gear of the compound gear and the single gear is activated by a bottom gear of the compound gear. A second spindle of the single gear is centrally disposed on the base of the enclosure and its lower portion is connected with an acceptor to which the containers are attached. The knob has a circumferential toothed portion on its inner circumference. The circumferential toothed portion is engageable with the upper gear.

2 Claims, 2 Drawing Sheets

CLEANING APPARATUS FOR CONTACT LENSES

BACKGROUND OF THE INVENTION

The present invention relates to a cleaning apparatus for contact lenses, and more particularly to such a cleaning apparatus for contact lenses which is rotatable by potential torque stored in a coil spring.

Although eye glasses are an essential tool which ensures the visually impaired clear sight, they are not always convenient or comfortable for daily wear. Consequently, contact lenses have become a popular alternative to eyeglasses, however, the cleaning procedure, important in order to keep eyes in healthy condition, is complicated.

In order to mitigate and/or obviate the above-mentioned drawbacks in the manner set forth in the detailed description of the preferred embodiment, the present invention is to provide a novel cleaning apparatus for contact lenses.

SUMMARY OF THE INVENTION

The primary objective of the present invention is to provide a cleaning apparatus for contact lenses which cleans the contact lenses by rotating them in a chemical rinse solution by means of a torque stored in a coil spring.

Another objective of the present invention is to provide a non-electrical cleaning apparatus for contact lenses.

These and additional objectives, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
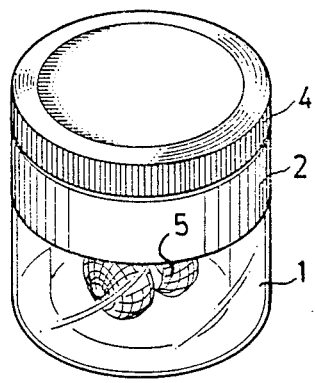
FIG. 1 is a perspective view of a cleaning apparatus for contact lenses in accordance with the present invention.
Figure 2:
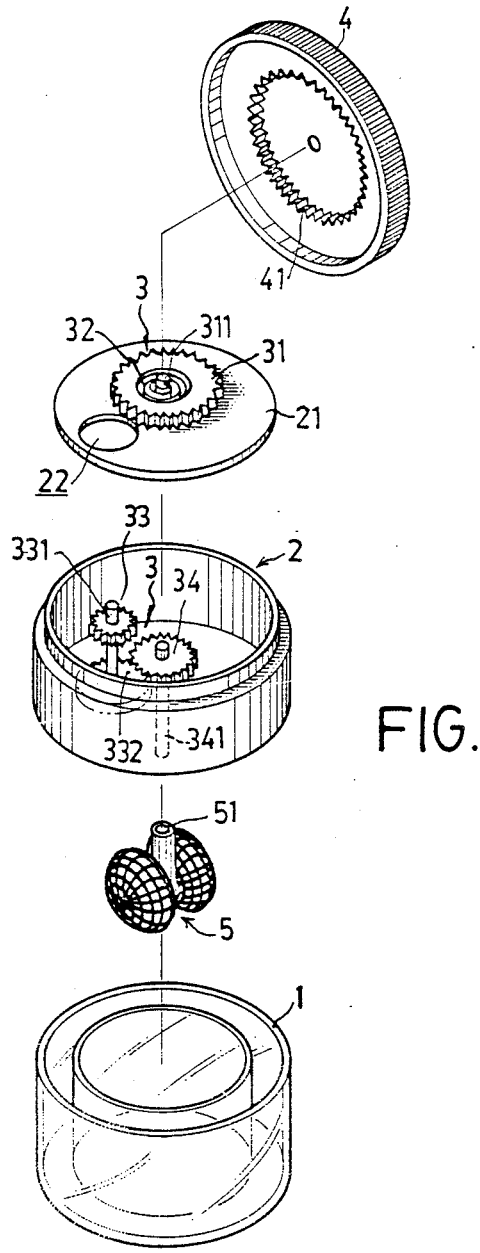
FIG. 2 is an exploded view of FIG. 1.

With reference to FIGS. 1 and 2, a cleaning apparatus for contact lenses generally comprises a housing 1, an enclosure 2 with a transmission means 3 installed therein comprising a main gear 31, a compound gear 33 and a single gear 34, a knob 4 and two containers 5 for retaining respective contact lens therein.

With reference to FIG. 2, the enclosure 2 is divided into an upper portion and a lower portion by a plate 21 which has an opening 22 therethrough. Within the upper portion the main gear 31, which loosely rests on the plate 21 and is loaded with a coil spring 32, is centrally disposed on the plate 21 and an upper gear 331 of the compound gear 33 is offset from the opening 22. Within the lower portion the single gear 34 is fixed on a bottom inside surface of the enclosure 2. The main gear and the single gear 34 are both engageable with the compound gear 33. The main gear 31 drives the upper gear 331 of the compound gear 33 and the single gear 34 is activated by a bottom gear 332 of the compound gear 33. One end of the coil spring 32 is connected to a first spindle 311 integral with the plate 21 and the other end of the coil spring 32 is connected to an inner surface of the main gear 31. A second spindle 341 extends downward from the base of the enclosure 2 to connect with an acceptor 51 which is combined with the containers 5.

The knob 4 has a circumferential toothed portion 41 on an inner circumference thereof. The circumferential toothed portion 41 is engageable with the upper gear 331 of the compound gear 33. Also, the knob 4 is rotatably fixed on the enclosure 2, which is detachably joined to the housing 1.

When the contact lenses are retained within the containers 5 for cleaning, the knob 4 should be rotated so that the circumferential toothed portion 41 engages with the upper gear 331 of the compound gear 33, and further activates the main gear 31 and consequently the single gear 34. At this time, the containers 5 are also rotatable as a result of the release of the torque stored within the coil spring 32. Subsequently, releasing the knob 4 causes the main gear 31 to rotate in a direction opposite to the direction in which the knob 4 is rotated.

Constructed in such a manner, one of the features of the present invention is that it is a non-electrical cleaning apparatus. Another feature is that the containers are rotatable by pre-stored energy in the coil spring which allows the contact lenses to be cleaned thoroughly.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A cleaning apparatus having a pair of containers for receiving contact lenses therein, comprising:

a cylindrical housing for containing a cleaning solution;

transmission means disposed within an enclosure for drivingly rotating said pair of containers;

plate means disposed within said enclosure for dividing said enclosure into an upper portion and a lower portion, said plate means including (1) a plate member having a through opening formed therein, and (2) a first spindle member fixedly coupled to said plate member adjacent said through opening;

said transmission means comprising:

(a) a main gear disposed within said upper portion of said enclosure and rotatably coupled to said first spindle member;

(b) spring means having one end coupled to said main gear and an opposing end coupled to said first spindle member for rotatably driving said main gear in a first direction subsequent to said main gear being rotatably driven in a second direction;

(c) an output gear disposed in said lower portion of said enclosure adjacent a bottom surface thereof, said output gear being coupled to a second spindle member, said second spindle member being coupled to said pair of containers for rotative displacement responsive to rotation of said output gear;

(d) compound gear means extending between said upper and lower portions of said enclosure through said through opening of said plate member for providing rotative coupling between said main gear and said output gear; and, (e) a knob member having an internal circumferential toothed portion in meshing relationship with said main gear for manual rotative displacement of said main gear in said second direction, whereby said rotation of said knob member in said second direction stores energy in said spring means for driving said main gear in said first direction subsequent to a manual release of said knob member.

2. The cleaning apparatus as recited in claim 1 where said cylindrical housing includes a pair of cylindrical wall members in spaced concentric relationship, an outer one of said pair of concentric wall members defining an outer wall of said housing and an inner wall member of said concentric pair defining a receptacle for receiving said cleaning solution.

* * * * *